Feb. 18, 1958 P. A. RAICHE 2,823,667
TO-AND-FRO BREATHER
Filed Jan. 24, 1955 2 Sheets-Sheet 1

INVENTOR.
Paul A. Raiche
BY Nathaniel Frucht
Atty

Feb. 18, 1958 P. A. RAICHE 2,823,667
TO-AND-FRO BREATHER
Filed Jan. 24, 1955 2 Sheets-Sheet 2

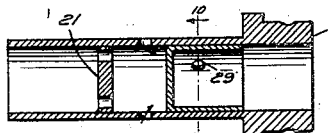
Fig. 9

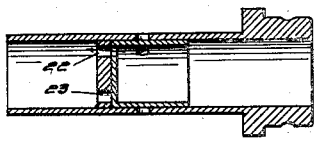
Fig. 10  Fig. 11

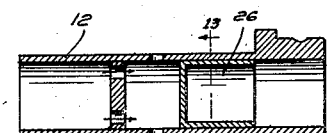
Fig. 12

Fig. 13

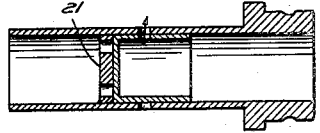
Fig. 14

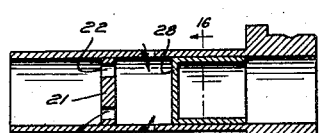
Fig. 15

Fig. 16

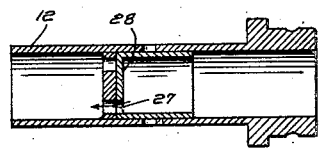
Fig. 17

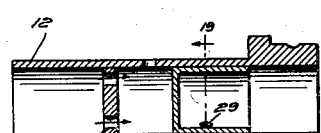
Fig. 18

Fig. 19

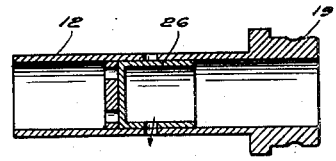
Fig. 20

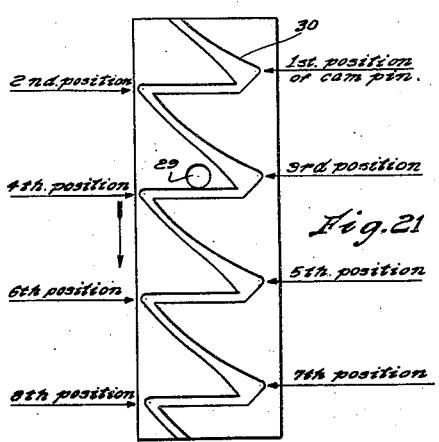
Fig. 21

1st. position - Fresh air going to bulb, Fig. 9 - Fig. 10.
2nd. position - Fresh air going to lungs through 1st port, Fig. 11.
3rd. position - Exhaust air going from lungs to bulb, Fig. 12 - Fig. 13.
4th position - Exhaust air going from bulb to atmosphere through 1st port, Fig. 14.
5th position - Fresh air going to bulb, Fig. 15 - Fig. 16.
6th. position - Fresh air going to lungs through 2nd port. Fig. 17.
7th position - Exhaust air going from lungs to bulb, Fig. 18 - Fig. 19.
8th position - Exhaust air going from bulb to atmosphere through 2nd. port, Fig. 20.

INVENTOR.
Paul A. Raiche
BY
Nathaniel Frucht
Atty

United States Patent Office 2,823,667
Patented Feb. 18, 1958

2,823,667

TO-AND-FRO BREATHER

Paul A. Raiche, North Providence, R. I.

Application January 24, 1955, Serial No. 483,688

5 Claims. (Cl. 128—29)

The present invention relates to respiration devices for producing artificial respiration, and has particular reference to hand-operated respirating apparatus.

Standard type respirators are bulky and expensive, and utilize chemical filled canisters which contain soda lime to absorb carbon dioxide gas and thus permit reuse of the air. Intake and exhaust of fresh air has heretofore been possible only through manual manipulation.

It is the principal object of the invention to provide a hand-operated respirator which exhausts air from the lugs to the atmosphere, and takes in fresh air which is then forced into the lungs, the speed of intake and exhaust being regulated by manual pressure to simulate and to stimulate natural breathing.

Another object of the invention is to provide a breathing device with a manually operable bulb or pump and with a to-and-fro sliding and turning control valve which automatically shifts as the bulb or pump is operated.

A further object of the invention is to provide a cam actuated sliding rotating valve arrangement for a respiration apparatus which is shifted by the air flow.

With the above and other objects and advantageous features in view, the invention consists of a novel arrangement of parts more fully disclosed in the detailed description following, in conjunction with the accompanying drawings, and more specifically defined in the claims appended thereto.

In the drawings,

Figs. 9, 11, 12, 14, 15, 17, 18 and 20 are sectional views showing the sliding positions of the control valve during one operating cycle, the cam groove being omitted;

Figs. 10, 13, 16 and 19 are sections on the lines 10—10 of Fig. 9, 13—13 of Fig. 12, 16—16 of Fig. 15 and 19—19 of Fig. 18, showing the rotating positions of the control valve during the operating position; and Fig. 21 is a plane position layout of the control valve cam groove.

Figure 1:
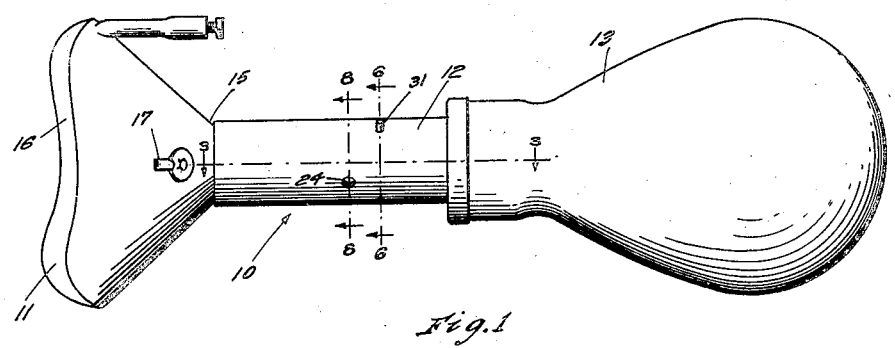
Fig. 1 is a plan view of an illustrative respirator embodying the invention.
Figure 2:
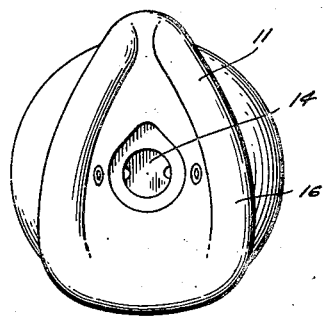
Fig. 2 is an end view of a standard type face mask.
Figure 3:
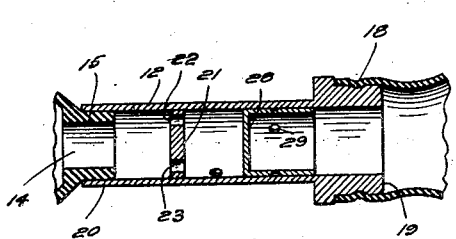
Fig. 3 is a section on the line 3—3 of Fig. 1.
Figure 8:
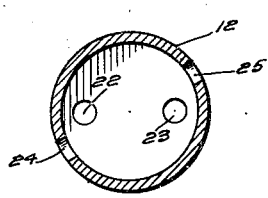
Fig. 8 is an enlarged section on the line 8—8 of Fig. 1.

Referring to the drawings, the illustrated respirator apparatus 10 includes a face mask 11, a generally cylindrical tube 12, and and an inflatable bulb 13. The face mask or mouth piece 11 is of standard type, with an air flow passage 14 having a flexible rear portion 15, an inflatable cushion rim 16 and strap receiving clips 17; the bulb 13 is also of standard type, with its open end 18 frictionally locked over the enlarged end 19 of the tube 12. The tube 12 is preferably of transparent plastic, with its forward end 20 wedge-receiving the soft rubber rear portion 15 of the face mask air flow passage, and with a transverse portion 21, see Fig. 3, having two diametrically opposed flow ports 22, 23; the tube 12 has two diametrically opposite wall ports 24, 25 to the rear of the partition, as shown in Figs. 8 and 9.

Figure 4:
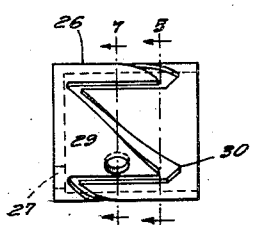
Fig. 4 is a side view of the control valve.
Figure 5:
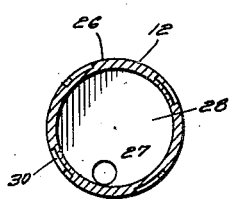
Fig. 5 is a section on the line 5—5 of Fig. 4.
Figure 6:
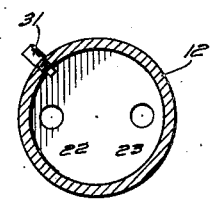
Fig. 6 is an enlarged section on the line 6—6 of Fig. 1.
Figure 7:
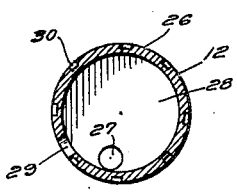
Fig. 7 is a section on the line 7—7 of Fig. 4.

A control valve 26 of cup shape and preferably made of transparent plastic is slidably seated in the tube 12, and has a port 27 in the base 28 thereof adapted to selectively register with the partition ports 22, 23, and a wall port 29 adapted to selectively register with the tube wall ports 24, 25, the selective registration being controlled by a cam groove 30, see Figs. 4 and 21, which receives the inner end of a pin 31 fixed in the wall of the tube 12. The size of the valve ports is determined so that the air pressure on the valve base will build up and reciprocate the valve as it turns, as hereinafter explained.

The operation of the novel respirator is clearly shown in Figs. 9 to 20 and explained in connection with Fig. 21. Assuming the start of a cycle of operation, the valve is positioned as shown in Fig. 9; in this first position, air is entering the tube wall ports and passing through the valve base port to the bulb. The bulb is now pressed; the valve is forced forwardly and turns to second position, see Fig. 11, and the valve base port registers with one partition port, thus forcing air into the lungs.

Release of manual pressure on the bulb draws the air back, see Fig. 12, the valve sliding back and turning to third position, whereby exhaust air from the lungs is drawn into the bulb. Pressing the bulb shifts the valve up, see Fig. 14, and turns it to fourth position to exhaust the exhaust air from the bulb and through one tube wall port to atmosphere. Release of the manual pressure slides the valve back to fifth position, see Fig. 15, to intake fresh air through the tube wall ports and into the bulb, as the lungs are in collapsed position, whereupon manual pressure on the bulb forces the valve forwardly again to sixth position, see Fig. 17, to force fresh air into the lungs. Release of the manual pressure draws back the valve to seventh position, see Fig. 18, to exhaust the air from the lungs into the bulb, whereupon pressure on the bulb shifts the valve to eighth position and exhausts the exhaust air to atmosphere as shown in Fig. 20. Release of the manual pressure on the bulb completes the cycle, and the parts again assume the first position of Fig. 9.

It is thus clear that a controlled rate of pressing and releasing of the bulb will produce inhaling of fresh air and exhaling of exhaust air; thus, a rate of squeezing of the bulb of 46 per minute will provide a breathing rate of 23 per minute.

Although I have described a specific construction embodiment of my invention, which embodiment is designed to be a low cost device, it is obvious that changes in the size, shape, and arrangement of the parts, and in the substitution of a pump in place of a rubber bulb, may be made to meet different breather and respirator requirements, without departing from the spirit or the scope of the invention as defined in the claims appended thereto.

I claim:

1. In a respirator, a flow tube, means at one end thereof for introducing air to the lungs of a patient, a source of alternate pressure and suction pulsations communicating with the other end thereof, a partition in said tube having flow port means, said tube having wall port means intermediate the partition and said other end, and a control device in said tube intermediate the partition and the other end and movable through a series of cyclatory positions responsive to successive suction, and pressure pulsations from said source, said device being movable from a first position wherein air is drawn into said source through the wall port means upon a suction pulsation from the source to a second position wherein the air is forced through the partition flow port means and the introducing means to the patient's lungs upon pressure pulsation from said source, to a third position wherein the next successive suction pulsation causes air to be withdrawn from the patient's lungs into the source through the partition flow port means and to a fourth and final position wherein the next successive pressure pulsation expels air from the source through the wall port means.

2. In the combination of claim 1, said source of alternate pressure and suction pulsations being manually operable.

3. In the combination of claim 1, said control device comprising a cup-shape valve telescopingly received within said flow tube for longitudinal and axial movement therein, the base end of said valve being disposed toward the tube partition and having a port therein, and a second port in said valve wall.

4. In the combination of claim 2, said source being a hollow bulb of resilient material.

5. In the combination of claim 3, said valve having a cam groove and said tube having a pin seated therein, said pin and groove cooperating to sequentially move said valve to its cyclatory positions responsive to successive suction and pressure pulsations.

References Cited in the file of this patent

UNITED STATES PATENTS

| | | |
|---|---|---|
| 1,177,208 | Pierpont | Mar. 28, 1916 |
| 2,428,451 | Emerson | Oct. 7, 1947 |